W. H. ELLIOT.
GOVERNOR FOR MARINE ENGINES.
No. 16,593. Patented Feb. 10, 1857.
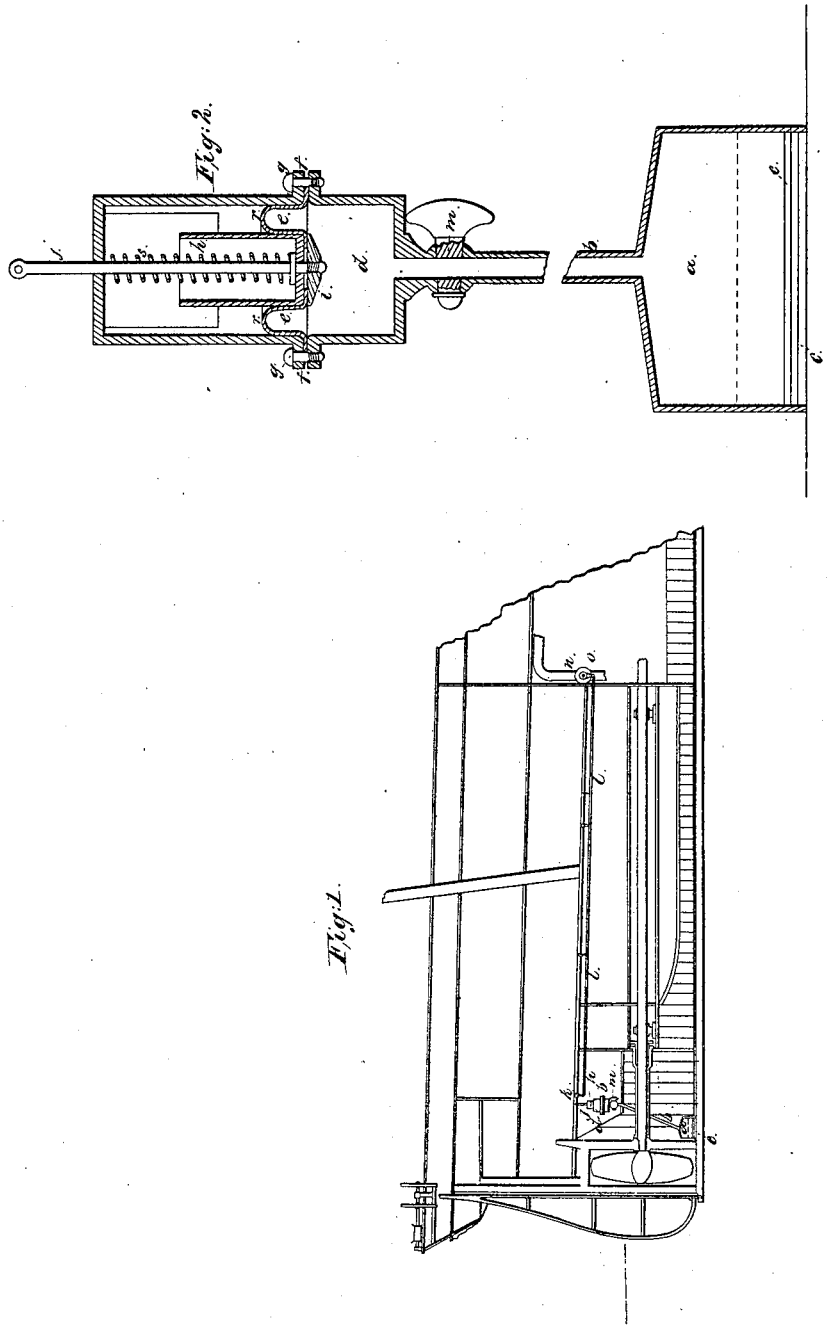

UNITED STATES PATENT OFFICE.

WILLIAM H. ELLIOT, OF PLATTSBURG, NEW YORK.

ARRANGEMENT OF MEANS FOR CONTROLLING THE THROTTLE-VALVES OF MARINE ENGINES.

Specification of Letters Patent No. 16,593, dated February 10, 1857.

*To all whom it may concern:*

Be it known that I, WM. H. ELLIOT, of Plattsburg, county of Clinton, State of New York, have invented a new and useful Governor for Marine Engines; and I do hereby declare that the following is a full and exact description thereof, reference being had to the accompanying drawings and to the letters of reference marked thereon.

The nature of my invention relates to the combination and arrangement of certain devices by which the supply of steam to a marine engine is regulated and controlled through the pressure of the water at, or near, the bottom of the propelling wheel of the vessel, so that the volume of it passing into the cylinder shall be in exact proportion to the draft of water of the portion of the vessel in the immediate vicinity of the wheel, for the purpose of equalizing the motion of the engine whether the propelling wheel is submerged to its proper depth, or deeply buried in, or raised entirely out of the water.

To enable others to make and use my invention, I will proceed to describe its construction and operation.

Figure 1 is a portion of the stem of a steamship, showing the governor in the position which it occupies in the vessel. Fig. 2 is a section of the governor showing its construction in detail.

Similar letters of reference indicate the same parts in each figure.

A Fig. 1 is a chamber composed of some solid air-tight material, placed as represented in the deadwood as near the bottom of the wheel or propeller as possible. This chamber sends off from its upper side a tube or pipe $b$, of similar material, to the interior of the vessel. It has also external openings $c$, $c$, along each side of the bottom which allow the water outside the ship to pass freely into the chamber. The pipe $b$ passes through the deadwood and terminates in cylinder $d$. This cylinder is closed air-tight on all sides, having no opening when in use except through pipe $b$. It is also provided with a movable or elastic head or piston $e$, it may be an ordinary packed piston, but as it is required to be perfectly air tight, and to move without friction, the diaphragm $r$ is thought preferable. The cylinder $d$ is made in two parts and put together at $f$, $f$, between the two halves of the cylinder the outer edge of the diaphragm is fastened and held firmly by screws $g$, $g$. The center of the diaphragm is fastened to the plunger $h$, by means of screw nut $i$ and rod $j$, the upper end of rod $j$ is attached to one end of angle $k$, one end of connecting rod C is attached to the other leg of angle $k$, the other end of connecting rod C being attached to the arm of the throttle valve $o$ $n$ throttle valve and portion of steam pipe $s$, spiral spring which forces down plunger $h$ $m$ stop cock which is used when it becomes necessary to partially or entirely close the pipe $b$.

In use, the governor operates as follows the cylinder $d$, pipe $b$, and all but the lower portion of chamber $a$ are supposed to contain nothing but air, and as the stern of the vessel sinks into or rises from the wave the pressure of the water in the lower portion of the chamber forces the air through the pipe $b$ into cylinder $d$ and creates a pressure under the diaphragm or piston exactly equal to the pressure of the water in the chamber $a$, the diaphragm being held down by spring $s$, it rises or falls as this pressure increases or diminishes. The motions of the diaphragm are communicated to the throttle valve by means of rod $j$ angle $k$ and connecting rod C, and arm $o$ of of the throttle valve. Any variation in the height of the water immediately in the vicinity of the chamber $a$, creates a corresponding variation in the pressure of the air within the cylinder $d$, and as the spring $s$, allows the diaphragm to rise in proportion to the pressure beneath it, the valves receives a motion exactly corresponding in proportion to the rise and fall of the water at the propeller.

By placing the cylinder $d$ in the engine room near the throttle valve, the long connecting rod C might be dispensed with, in that case the length of pipe $b$ must be increased so as to reach the cylinder in the engine room. By inverting cylinder $d$, passing the pipe $b$ into it on the upper side and placing the diaphragm or piston upon the lower side, all the space in the cylinder not occupied by the diaphragm and plunger when the spring is extended may be filled with water or other liquid, this would have two advantages, viz: First, there would be less air-space in the cylinder and would still work with the same effect. Second, all joints of the cylinder being covered with water it would require less trouble to make them tight.

In case the motion of the vessel and waves should at any time throw the chamber $a$ entirely out of water which may often be the case in rough weather, all the water in chamber $a$ would run out and the chamber would be filled by air, so that any loss of air from the apparatus by leakage would in this way be supplied, or a small air pump might be so worked as to keep all parts properly filled with air.

A very good substitute for the spring $s$ may be had in a weight so arranged as to rise or fall as the pressure upon the movable head of the cylinder increases or diminished, and this may be effected by attaching the weights to the end of the arm of a rock shaft in such a manner that when there is no pressure in the cylinder, the arm with the weight upon it will hang perpendicularly under the shafts, but as the pressure increases the arm would assume a horizontal position, or it may be done by the combined action of a spring and weight, in such a manner that the spring will sustain all the weight when there is no pressure in the cylinder, though these methods would only be equivalents of the spring $s$.

I do not claim regulating and controlling the supply of steam admitted to the cylinder of a marine engine by the varying pressure of the water caused by the varying depths to which the vessel may be immersed, neither do I claim the devices employed by me for that purpose separate from the combination and arrangement in which I use them, but What I do claim as my invention and desire to secure by Letters Patent is—

The chamber A, cylinder D, plunger H, and spring S, when arranged in relation to the engine and to the hull of the vessel and to each other in the manner herein described and for the purposes set forth.

WM. H. ELLIOT.

Witnesses:
WM. KEYES,
C. HALSEY.